United States Patent [19]
Kimura

[11] Patent Number: 5,692,464
[45] Date of Patent: Dec. 2, 1997

[54] DIESEL ENGINE

[75] Inventor: Shuji Kimura, Yokosuka, Japan

[73] Assignee: Nissan Motor Co., Ltd., Yokohama, Japan

[21] Appl. No.: 612,523

[22] Filed: Mar. 8, 1996

[30] Foreign Application Priority Data

Mar. 16, 1995 [JP] Japan ............................. 7-057409

[51] Int. Cl.$^6$ ............................. F02D 13/00; F01L 13/00
[52] U.S. Cl. ...................... 123/90.15; 123/569; 123/501
[58] Field of Search ...................... 123/90.15, 90.16, 123/90.17, 568, 569, 500, 501, 503

[56] References Cited

U.S. PATENT DOCUMENTS

| | | | |
|---|---|---|---|
| 5,293,741 | 3/1994 | Kashiyama et al. | 123/90.15 |
| 5,482,012 | 1/1996 | Yoshioka | 123/90.15 |
| 5,529,031 | 6/1996 | Yoshioka | 123/90.15 |

FOREIGN PATENT DOCUMENTS 60-162018   8/1985   Japan .

*Primary Examiner*—Weilun Lo
*Attorney, Agent, or Firm*—Lowe, Price, LeBlanc & Becker

[57] ABSTRACT

In a diesel engine, the closing timing for the intake valves is maintained in the vicinity of bottom dead center during engine starting and in a low engine revolution speed region, while on the other hand this closing timing is retarded the more from bottom dead center, the higher is the engine revolution speed region, and thereby the engine can be designed with a lower compression ratio. Preferably the temperature within the cylinder at compression top dead center, i.e. the compressions stroke end temperature, is calculated, and the closing timing for the intake valves is controlled so as to keep this final compression temperature within a predetermined range. By doing this, reduction of the size of the diesel engine is made possible due to lowering of the compression ratio thereof, while both the composition of the exhaust gas and also engine output power are maintained at preferable levels.

2 Claims, 18 Drawing Sheets

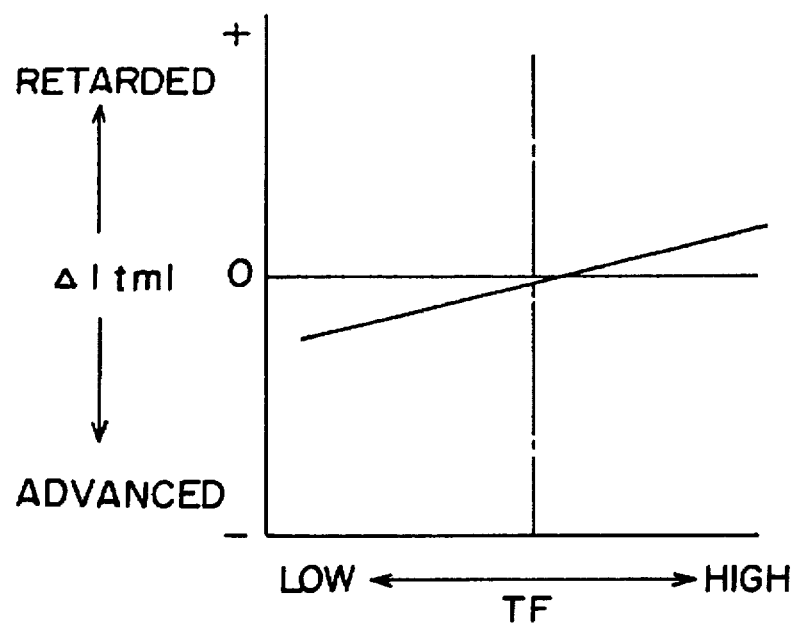
F I G. 15
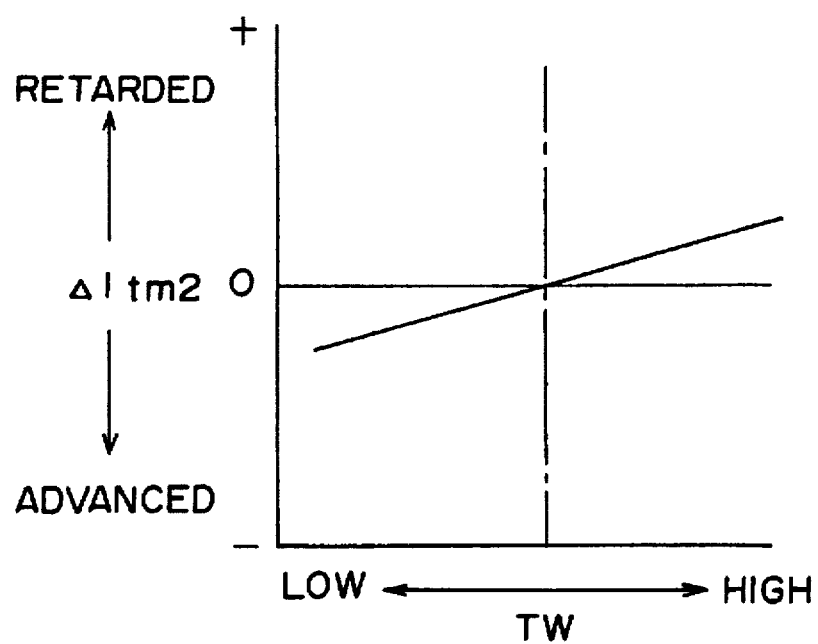
F I G. 16

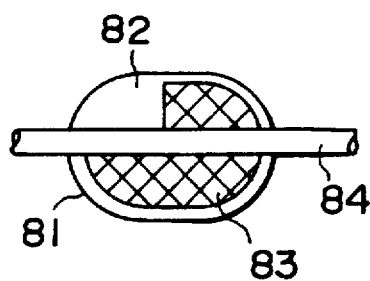
F I G. 17
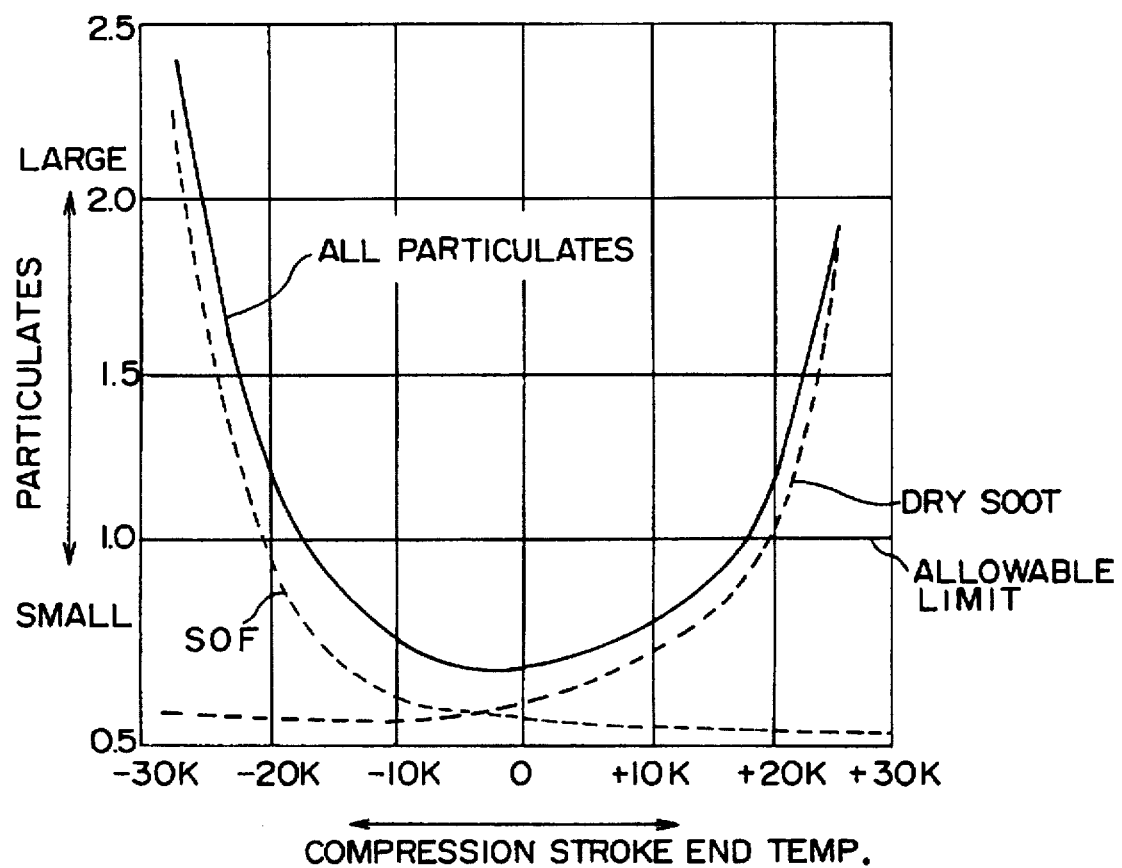
F I G. 18

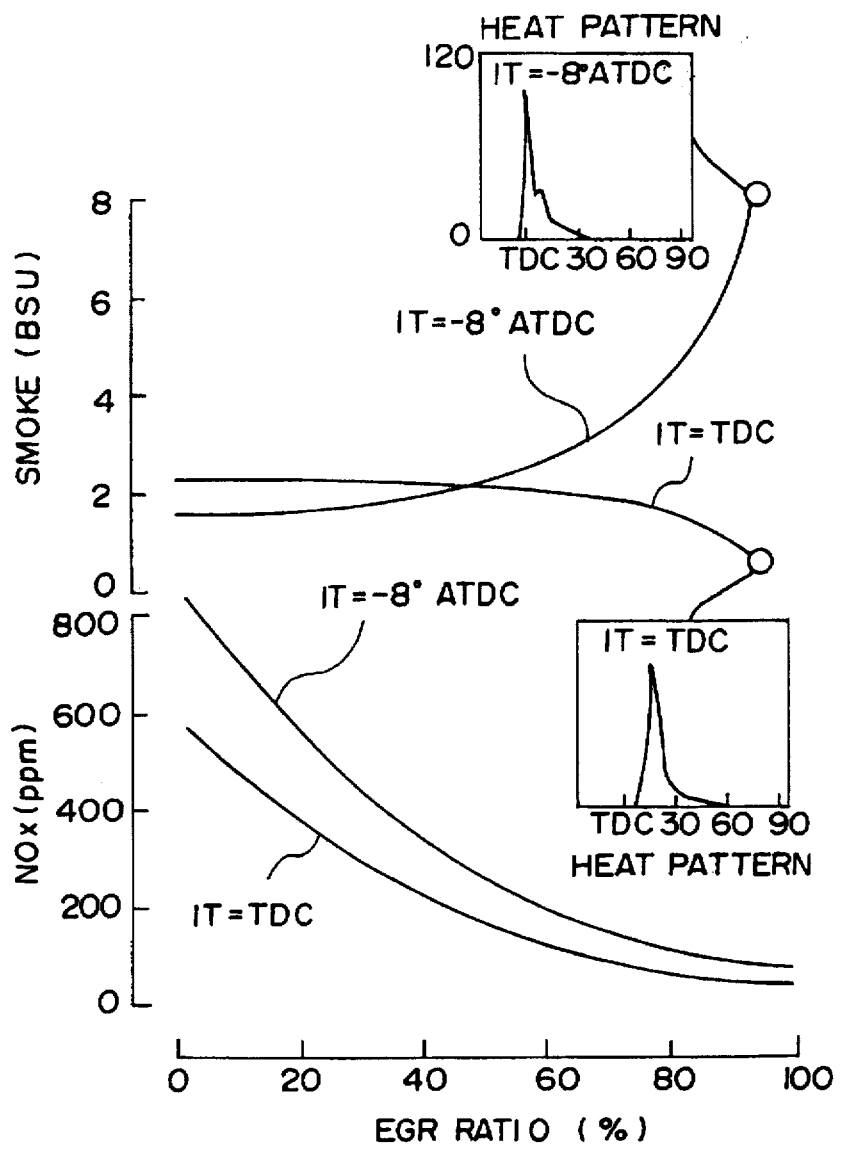

DIESEL ENGINE

FIELD OF THE INVENTION

This invention relates to control of the air intake valve closing timing for a diesel engine.

BACKGROUND OF THE INVENTION

In order for a diesel engine to have favorable air charging efficiency when operating at high revolution speed, usually the closing timing of the air intake valves is greatly retarded, being set substantially later than bottom dead center. Further, since when the closing timing of the intake valves is retarded the startability of the engine is made worse and also the soluble organic fraction (SOF) of particulates, which is a cause of white smoke emission in the low revolution speed region, is increased, the compression ratio is set to be high in order to prevent these handicaps. For example the compression ratio of a small size diesel engine for an automobile may be about 20.

However, a high compression ratio for an engine entails difficulties for reductions in the size and in the weight of the engine, and moreover raises the temperature of combustion, which causes the problem that the amount of NOx in the exhaust gas is increased.

In this connection, in order to restrain the amount of NOx in the exhaust gases, one expedient has been to employ an EGR (Exhaust Gas Recirculation) device which recirculates a portion of the exhaust gas back into the intake system, but if the mount of EGR is increased the mount of smoke (mainly black smoke) in the exhaust gas is also increased.

In order to reduce this smoke, in Tokkai Sho 60-162018, published by the Japanese Patent Office in 1985, there is disclosed the concept of moderating smoke by providing a swirl generating mechanism which excites swirl in the intake air in the fuel combustion chamber, so as to improve the mixing of the air and the fuel during diffusive combustion. In this engine, this swirl generating construction consists of an air flow control plate provided in a helically formed intake port.

However, if the EGR amount is significantly Increased, for example due to the regulations pertaining to NOx content In the exhaust gas becoming more stringent, then it becomes difficult to reduce smoke sufficiently with the mixing together of intake air and fuel being encouraged only by swirl, since the ratio of utilization of the intake air is deteriorated in accompaniment with elevation of the temperature thereof and high compression ratio therefor.

SUMMARY OF THE INVENTION

It is therefore an object of this Invention to implement reduction of the compression ratio of a diesel engine, while maintaining a satisfactory exhaust gas composition.

It is a further object of this invention to increase the power output of a diesel engine in the high revolution speed region.

It is still a further object of this invention to implement reduction of the weight of a diesel engine.

In order to achieve the above objects, this invention provides a diesel engine comprising a cylinder, a piston which reciprocates within the cylinder between a bottom dead center position and a top dead center position, an intake valve for providing air to the cylinder, a mechanism for altering closing timing of the intake valve, a mechanism for detecting engine revolution speed, and a mechanism for controlling the closing timing alteration mechanism so as to retard the closing timing of the intake valve more from the bottom dead center position, the higher is the engine revolution speed.

It is preferable that the control mechanism maintains the closing timing of the intake valve in the vicinity of the bottom dead center position during engine starting and in a low engine revolution speed region.

It is also preferable that the control mechanism maintains the closing timing of the intake valve at least 30° retarded after the bottom dead center position for an engine revolution speed above 3000 rpm.

It is also preferable that a compression ratio of the piston is about 18 or less.

This invention also provides diesel engine comprising a cylinder, a piston which reciprocates within the cylinder between a bottom dead center position and a top dead center position, an intake valve for providing air to the cylinder, a mechanism for altering closing timing of the intake valve, a mechanism for detecting an engine operational condition, a mechanism for detecting a temperature of the air, a mechanism for detecting a flow amount of the air, a mechanism for calculating a temperature within the cylinder at compression top dead center from the engine operational condition, the air temperature, the air flow amount and a compression ratio of the piston, and a mechanism for controlling the closing timing alteration mechanism so as to advance the closing timing of the intake valve when the temperature within the cylinder is lower than a predetermined range, and so as to retard the closing timing of the intake valve when the temperature within the cylinder is higher than the predetermined range.

It is also preferable that the engine further comprises a mechanism for injecting fuel into the cylinder at a predetermined timing, a mechanism for providing a portion of exhaust gas to the cylinder and a mechanism for retarding the predetermined timing according to an mount of the portion of exhaust gas.

The details as well as other features and advantages of this invention are set forth in the remainder of the specification and are shown in the accompanying drawings.

BRIEF DESCRIPTION OF THE DRAWINGS

FIG. 15 is a graph showing the characteristic of a fuel temperature correction value $\Delta \text{Itm}_1$, according to the second embodiment of this invention.

FIG. 16 is a graph showing the characteristic of a water temperature correction value $\Delta \text{Itm}_2$, according to the second embodiment of this invention.

FIG. 17 is a plan view of a swirl valve according to the second embodiment of this invention.

FIG. 18 is a graph showing the relationship between a compression stroke end temperature Tc and the amount of particulate matter in the exhaust gas, according to the second embodiment of this invention.

FIGS. 20A and 20B are diagrams showing the amounts of smoke and NOx in the exhaust gas with respect to EGR ratio, according to the second embodiment of this invention.

DESCRIPTION OF THE PREFERRED EMBODIMENTS

Figure 1:
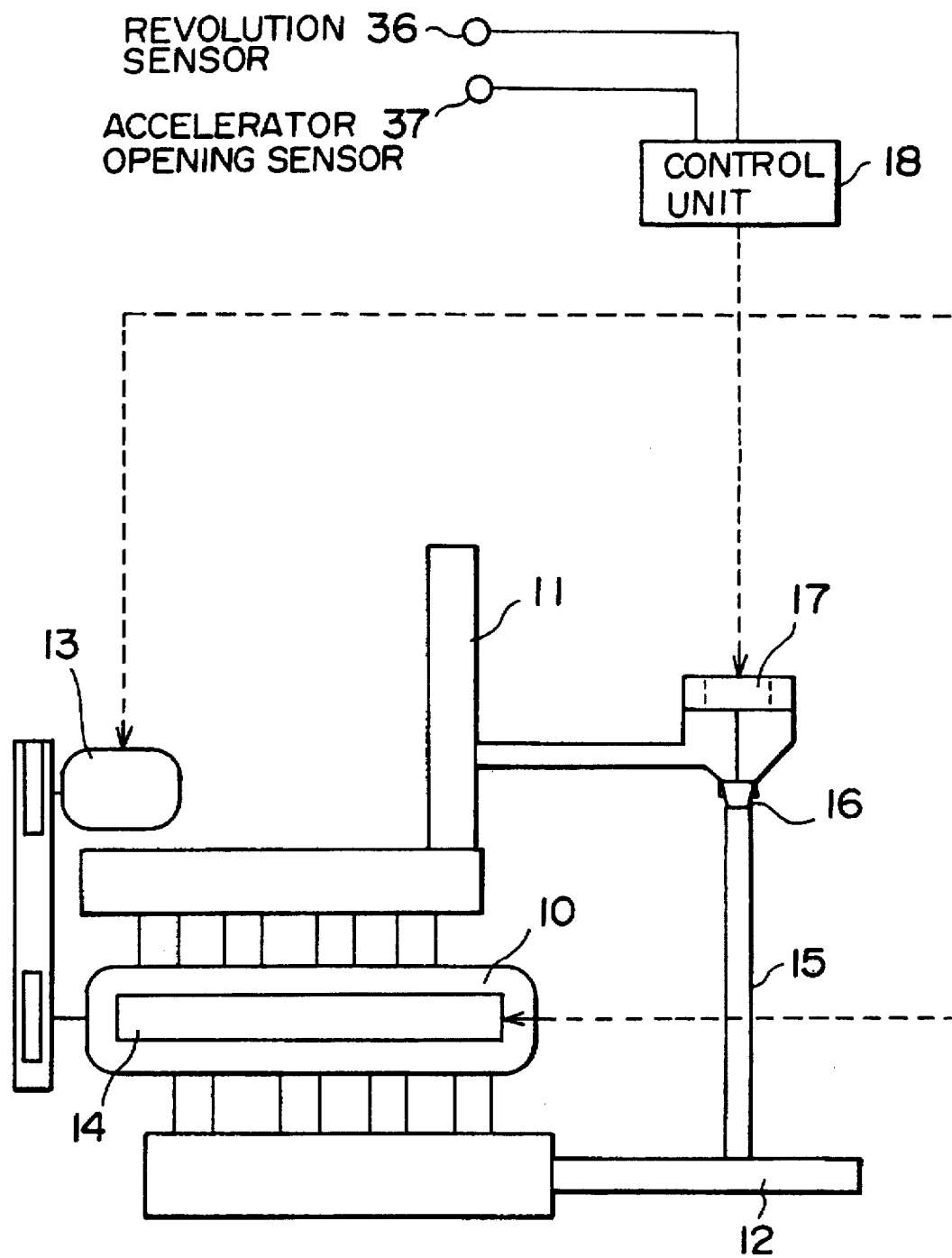
FIG. 1 is a schematic diagram of a diesel engine according to a first embodiment of this invention.

Referring to FIG. 1 of the drawings, a four cylinder diesel engine 10 for an automobile comprises an intake passage 11 and an exhaust passage 12. This engine 10 further comprises a fuel injection pump 13 which injects fuel via a fuel injection valve into the air which is provided through the intake passage 11, and an opening and closing timing alteration mechanism 14 which can alter the opening and closing timing of engine intake valves 20 which are shown in FIG. 2.

The intake passage 11 and the exhaust passage 12 are connected together via an EGR conduit 15. A diaphragm type EGR valve 16 is provided in this EGR conduit 15. The EGR valve 16 comprises a vacuum chamber 17. The vacuum in this vacuum chamber 17 is controlled by a control unit 18.

Figure 2:
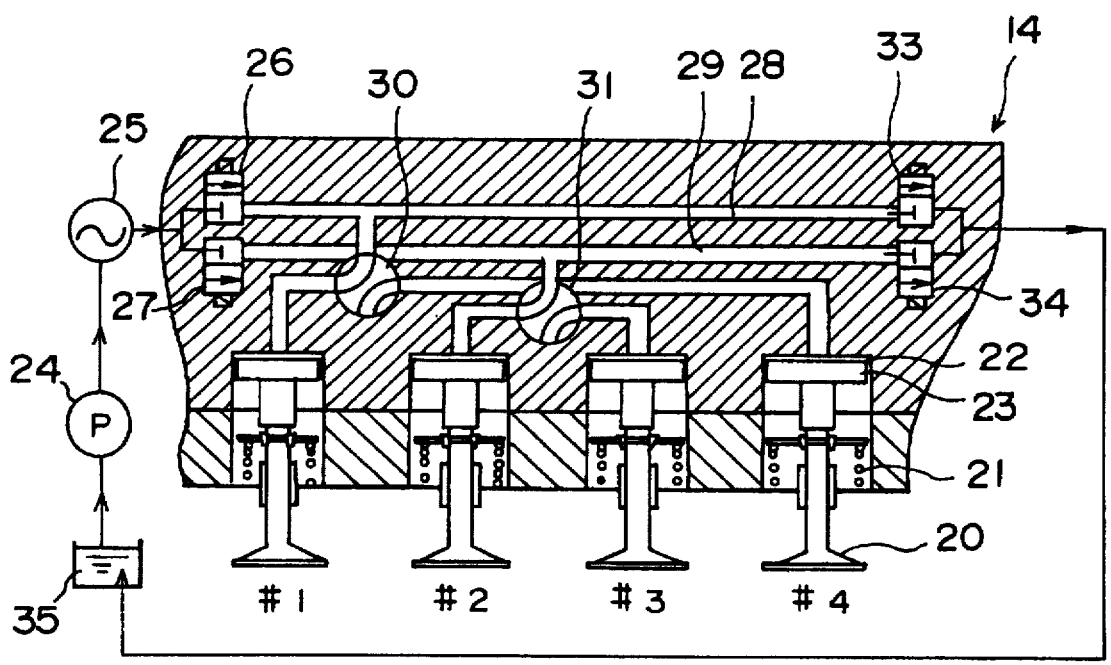
FIG. 2 is a vertical sectional view of an intake valve opening and closing timing alteration mechanism according to the first embodiment of this invention.

As shown in FIG. 2, the opening and closing timing alteration mechanism 14 comprises valve springs 21 which bias the intake valves 20 to close them, and pistons 23 which are in contact with the upper ends of the intake valves 20 and which define hydraulic chambers 22. When hydraulic pressure is supplied to each of these hydraulic chambers 22, it drives the corresponding piston 23 in the downwards direction in the figure, so as to open the corresponding intake valve 20 against the resistance of its valve spring 21.

A hydraulic pump 24 generates hydraulic pressure for the hydraulic chambers 22. This hydraulic pressure is selectively supplied from an accumulator 25 to hydraulic conduits 28 and 29 via inlet side electromagnetic switchover valves 26 and 27 respectively. Further, this hydraulic pressure is selectively fed to the hydraulic chambers 22 for each of the engine cylinders #1 through #4 via rotary valves 30 and 31 which rotate in synchronism with the crankshaft of the engine, and thereby the intake valves 20 are opened in appropriate sequence.

The operating hydraulic pressure in each of the hydraulic chambers 22 is selectively released from the hydraulic conduits 28 and 29 to a tank 35 via outlet side electromagnetic switchover valves 33 and 34. By doing this, the intake valves 20 are closed in appropriate sequence by the biasing actions of their springs 21. The control unit 18 controls the switching over of the outlet side electromagnetic switchover valves 33 and 34, and thereby the closing timing of the intake valves 20 is controlled.

To the control unit 18 there are supplied the output signals from an engine revolution sensor 36, which detects the revolution speed of the engine and the crank angle thereof, and from an accelerator opening sensor 37, which detects the opening amount of an accelerator pedal not shown in the figures, which corresponds to engine load.

Figure 3:
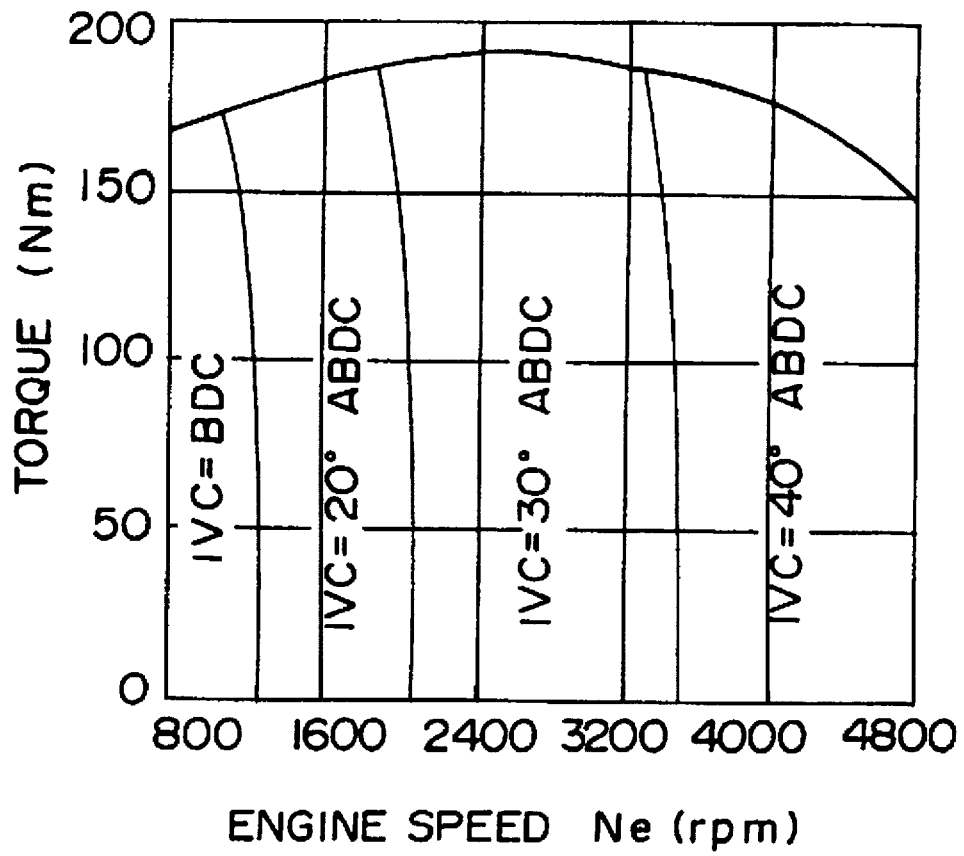
FIG. 3 is a graph of a desirable air intake valve closing timing characteristic, according to the first embodiment of this invention.

The control unit 18 switches over the outlet side electromagnetic switchover valves 33 and 34 so as to vary the closing timing of the intake valves 20 (IVC) according to regions determined in terms of engine operating revolution speed and load (torque) as shown in FIG. 3. In other words, when the engine is starting and in an idling revolution speed region the control unit 18 controls the outlet side electromagnetic switchover valves 33 and 34 so as to make the IVC coincide with piston bottom dead center (BDC). In a low engine revolution speed region these valves are switched over so as to make the IVC be equal to 20° after bottom dead center (ABDC). In a medium engine revolution speed region the IVC is made equal to 30° ABDC. And in a high engine revolution speed region the IVC is made equal to 40° ABDC.

Figure 4A:
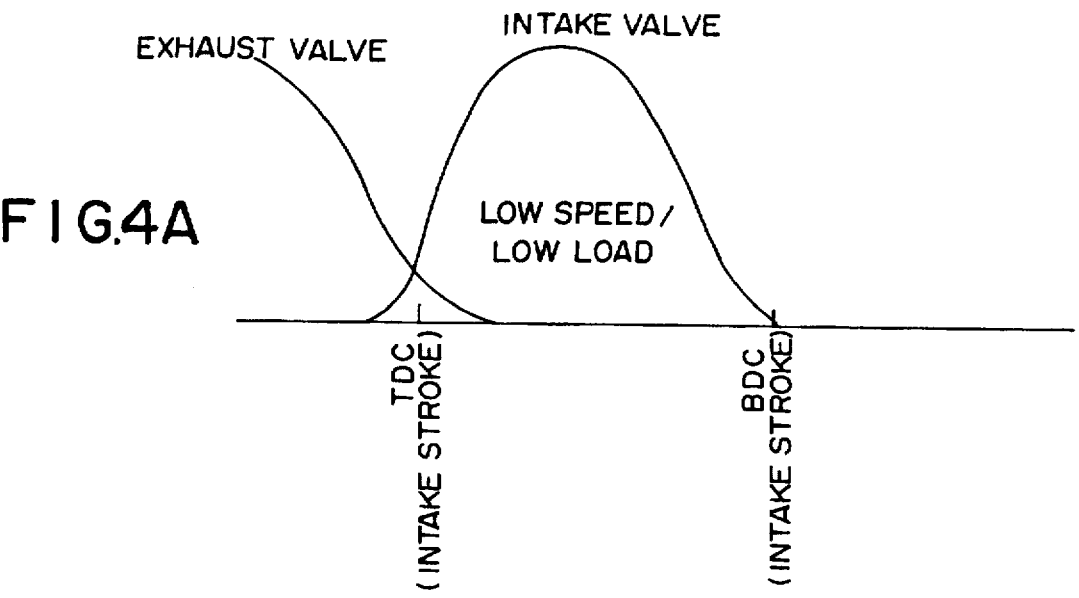
FIGS. 4A and 4B are diagrams of intake and exhaust valve operational characteristics, according to the first embodiment of this invention.
Figure 4B:
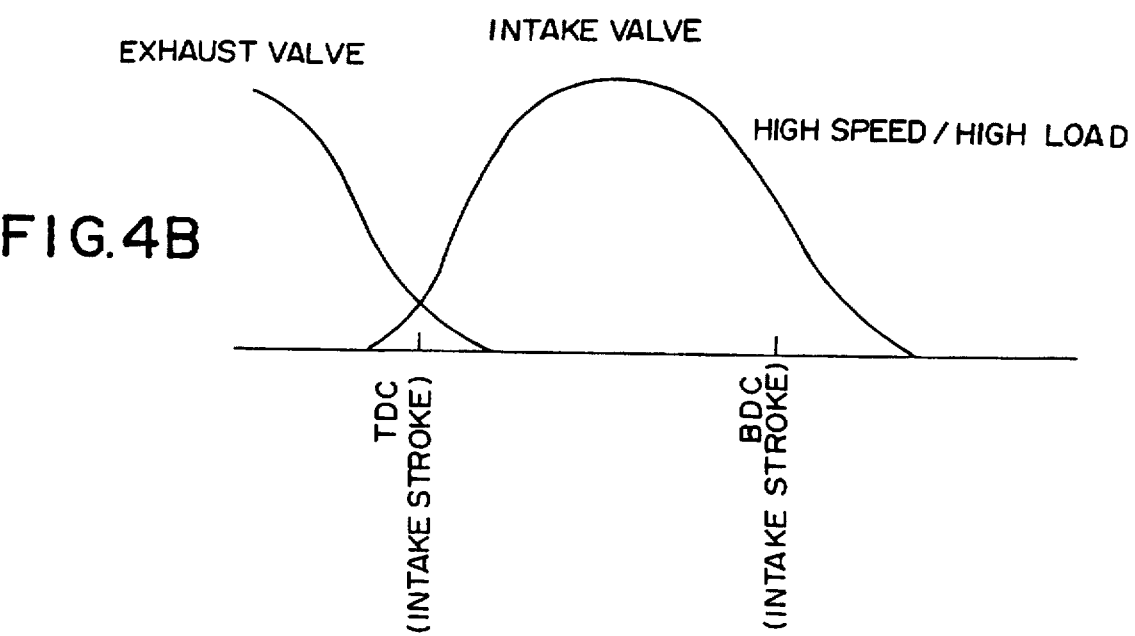

FIG. 4A shows a desirable operational characteristic of the intake valves 20 when the engine is being started and in the idling revolution speed region, add FIG. 4B shows a desirable operational characteristic of the intake valves 20 in the high revolution speed region. The control unit 18 switches over the outlet side electromagnetic switchover valves 33 and 34 so as to obtain these types of characteristics. Moreover, as shown in these figures, the inlet side electromagnetic switchover valves 26 and 27 are controlled so that the intake valves 20 always open at the same timing, without any dependence upon the revolution speed of the engine.

Figure 5:
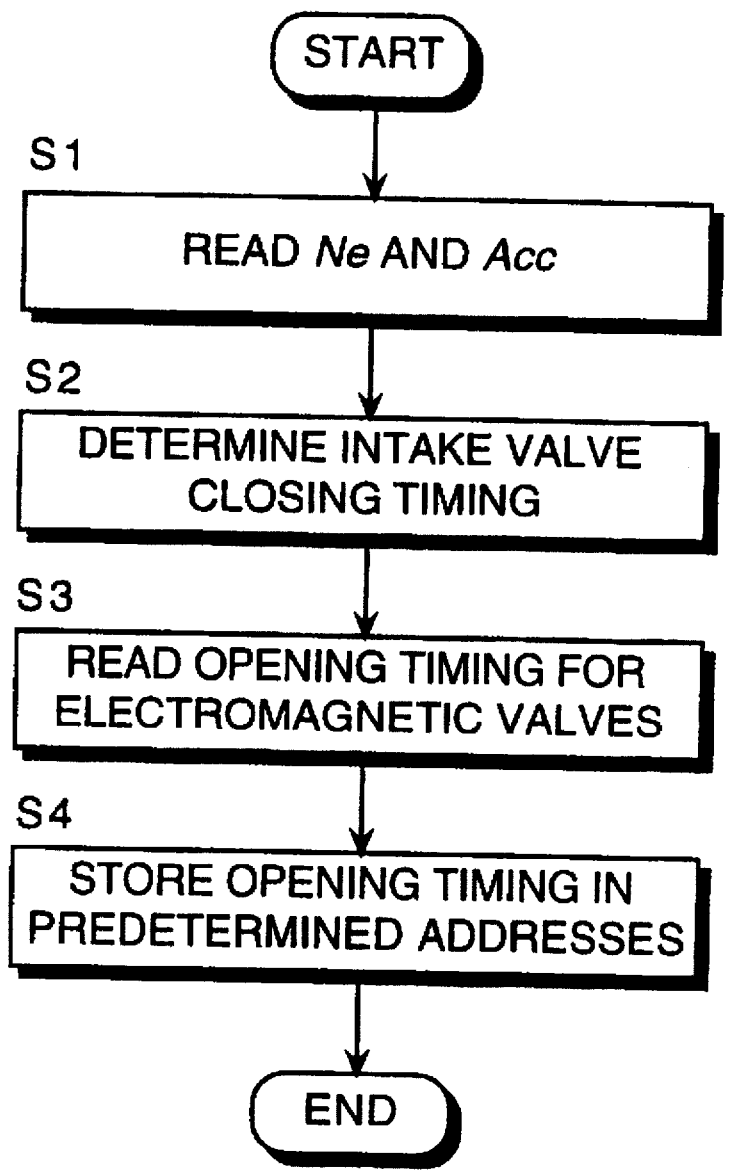
FIG. 5 is a flow chart showing a control process for intake valve closing timing, according to the first embodiment of this invention.

Next, a process for controlling the closing timing of the intake valves 20 will be explained, using the flow chart of FIG. 5.

In the step S1, the engine revolution speed Ne and the accelerator opening amount Acc are read in.

In the step S2, a decision is made from the map shown in FIG. 3 as to whether or not the region for the closing timing IVC of the intake valves 20 has changed, based upon the engine revolution speed Ne and the accelerator opening amount Acc. That is, a decision is made as to whether or not any change of the closing timing of the intake valves 20 is necessary.

In the steps S3 and S4, the opening time points for the outlet side electromagnetic switchover valves 33 and 34 are read out from the map and are stored in predetermined addresses. The closing time points of the intake valves 20 can be controlled by opening the outlet side electromagnetic switchover valves 33 and 34 in agreement with these opening time points.

Since at low engine revolution speed the closing timing of the intake valves 20 is controlled to be in the vicinity of bottom dead center, a high compression pressure is obtained during starting and in the low engine revolution speed region even without applying a high compression ratio.

Figure 6:
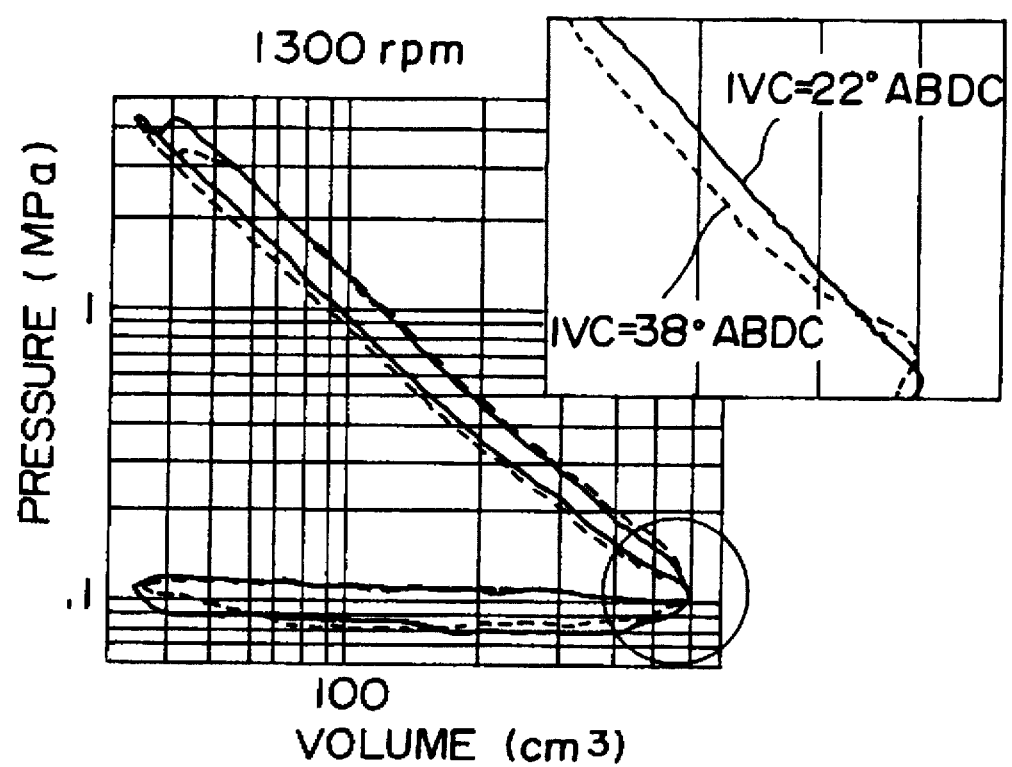
FIG. 6 is an indicator diagram of the diesel engine, with a part thereof magnified, according to the first embodiment of this invention.
Figure 7A:
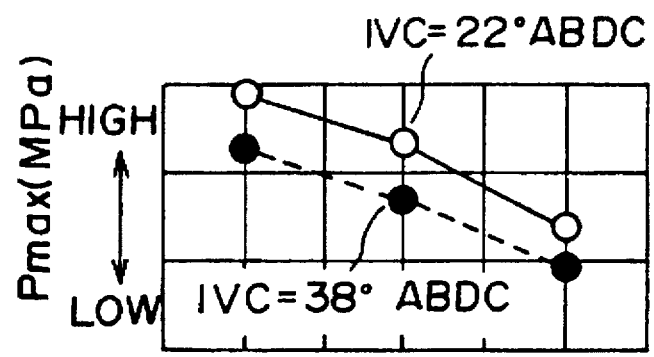
FIGS. 7A through 7D are graphs showing the characteristics of maximum cylinder internal pressure, intake amount, HC emission, and particulate matter emission, according to the first embodiment of this invention.
Figure 7B:
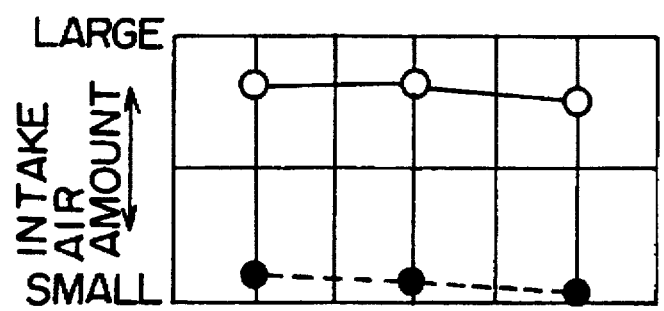
Figure 7C:
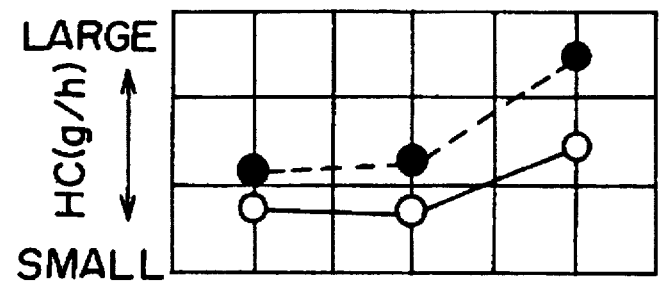
Figure 7D:
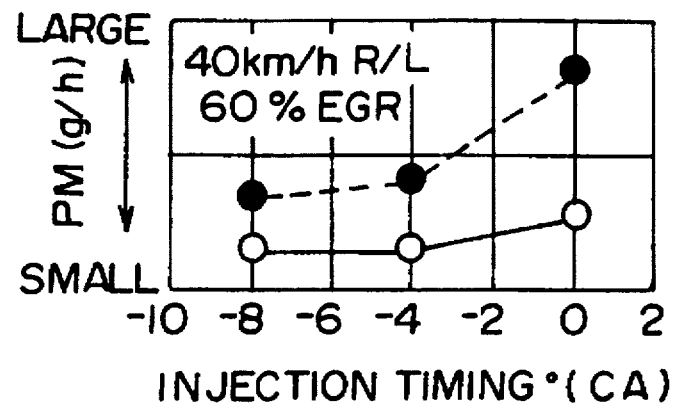

FIG. 6 shows an indicator diagram of the engine for different closing timings for the intake valves 20 at the low revolution speed region of 1300 rpm. As shown by the broken line in this figure, for the case when the closing timing is 38° ABDC, the pressure temporarily rises in the vicinity of bottom dead center, but the pressure does not immediately rise even when the piston moves upwards, since the closing timing of the intake valves 20 is retarded, and in practice the start of compression is retarded. On the other hand, as shown by the solid line in the figure, for the case when the closing timing is 22° ABDC, the pressure starts to rises as the piston moves upwards, and as a result a high maximum pressure is obtained. Good startability may be obtained by approaching the closing timing of the intake valves 20 the more towards the position of bottom dead center the lower is the engine revolution speed in this manner, and the amounts of HC and SOF emitted in the low engine revolution speed region are thereby reduced.

FIGS. 7A through 7D show the influence of different closing timing of the intake valves 20 upon various aspects of engine performance. As compared to an IVC of 38° ABDC, at an IVC of 22° ABDC, the maximum internal cylinder pressure (Pmax) is raised, and the intake amount is also considerably increased. Along with this, the emissions of HC and of particulates are also considerably reduced. This is due to the elevation of the gas temperature at compression top dead center caused by the apparent increase of compression ratio produced by the timing advancement of the start of compression. This result corresponds to the case in which the compression ratio has been elevated by about 2, in the state where the valve closure timing is set to that for the high revolution speed region.

On the other hand, a sufficient intake charging efficiency is always obtained, since control is exerted so that, the higher the engine revolution speed becomes, the greater is the angle of retardation after bottom dead center of the closing timing of the intake valves 20.

Figure 8:
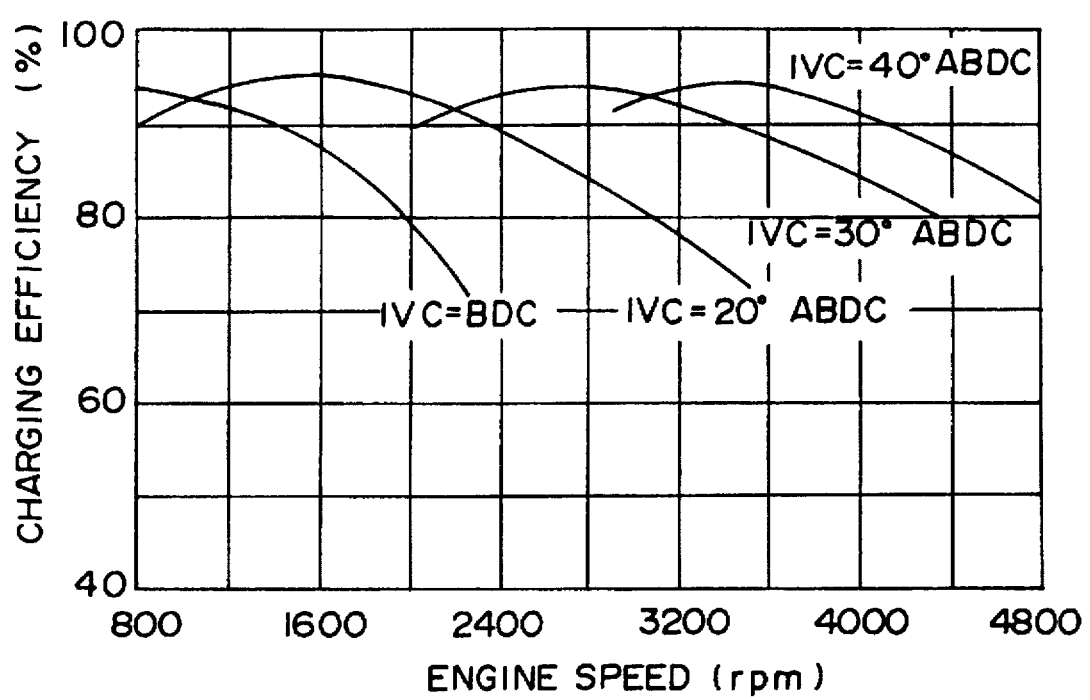
FIG. 8 is a graph showing charging efficiency characteristics, according to the first embodiment of this invention.

FIG. 8 shows the variation of air charging efficiency in relation to the engine revolution speed Ne and the closing timing of the intake valves 20. As the engine revolution speed rises from the low region to the high region, the closing timing of the intake valves 20 is retarded, and by retarding it to more than IVC=30° ABDC in the high revolution speed region, the charging efficiency is maintained at a maximum level.

By doing this, it is possible to maintain a high power output in the high revolution speed region while keeping the compression ratio low (18 or lower), and it is possible to suppress rise of the maximum internal cylinder pressure during high revolution speed high load conditions.

Accordingly, this invention does not lead to deterioration of startability or of exhaust gas quality in the low revolution speed region, nor does it involve raising the maximum internal cylinder pressure which would increase the generation of smoke; while it enable lightening of various parts of the engine as well as to improvement of the performance thereof.

With regard to the timing alteration mechanism 14 for the intake valves 20, it is possible to reduce the cost required for implementation of this invention by applying a variable mechanism for gasoline engines which is cheap and of simple.

FIGS. 9 through 20 show a second embodiment of this invention. This embodiment is applied to a diesel engine which has a high EGR ratio for reducing the emission levels of NOx, smoke, and SOF simultaneously.

Figure 9:
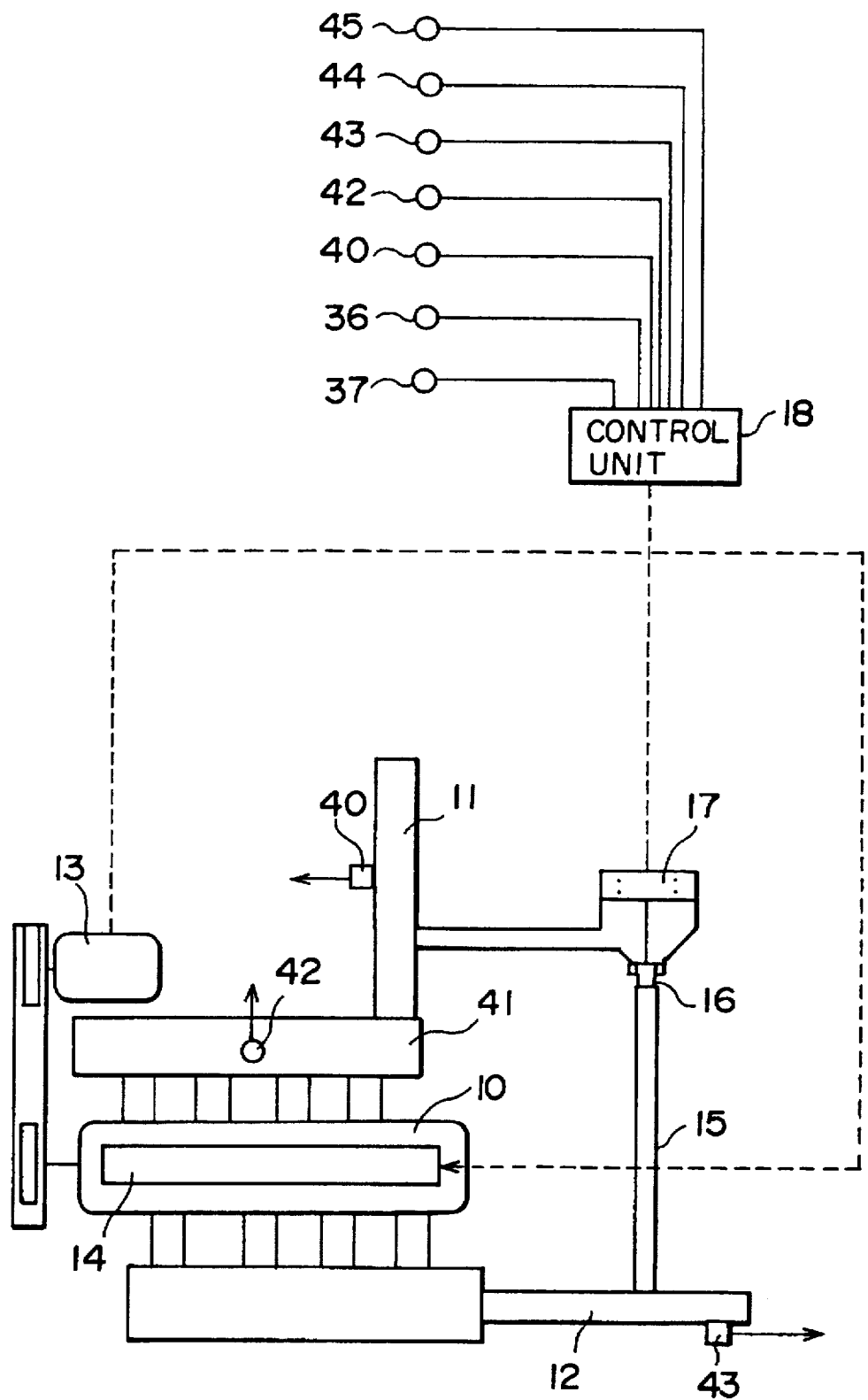
FIG. 9 is similar to FIG. 1, but showing a second embodiment of this invention.

In addition to the structure shown in FIG. 1, the engine 10 shown in FIG. 9 further comprises an air flow meter 40 which detects the flow mount Qa of the air through the intake passage 11, an intake air temperature sensor 42 which detects the temperature of the air in the intake manifold 41, an oxygen concentration sensor 43 which detects the oxygen concentration in the exhaust gas in the exhaust passage 12, a water temperature sensor 44 which detects the temperature Tw of the cooling water of the engine 10, and a fuel temperature sensor 45 which detects the temperature Tf of the fuel which is being supplied to the engine 10. The output signals from these sensors are input to the control unit 18.

Figure 10:
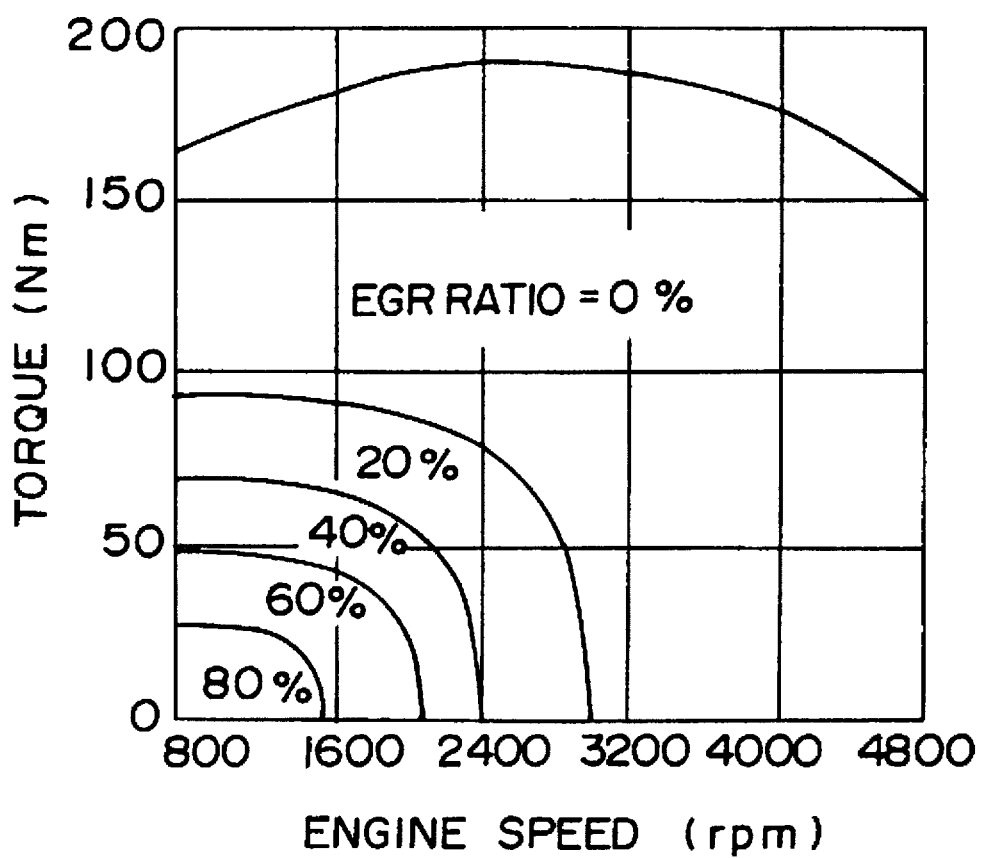
FIG. 10 is an EGR ratio specification map, according to the second embodiment of this invention.

The control unit 18 contains an EGR map as shown in FIG. 10. In this map, the EGR ratio is a maximum of 80% for the low revolution speed low load region, and when the revolution speed and the load are somewhat higher than in this region the EGR ratio is 60%. The greater the revolution speed and the load are, the lower is the EGR ratio.

Since in high load conditions the temperature of the exhaust gas is elevated, if a large quantity of EGR gas is recirculated, the efficiency of reduction of NOx is reduced, and the injected fuel ignition delay period is shortened due to the elevation of the intake gas temperature, and it become impossible to realize proper mixing of the fuel before combustion. For this reason, the EGR ratio is reduced in steps according to increase of the engine load.

The control unit 18 controls the vacuum supplied to the vacuum chamber 17 of the EGR valve 16 so as to implement the EGR ratio specified by this map, based upon the engine revolution speed Ne and the accelerator opening amount Acc.

Figure 11:
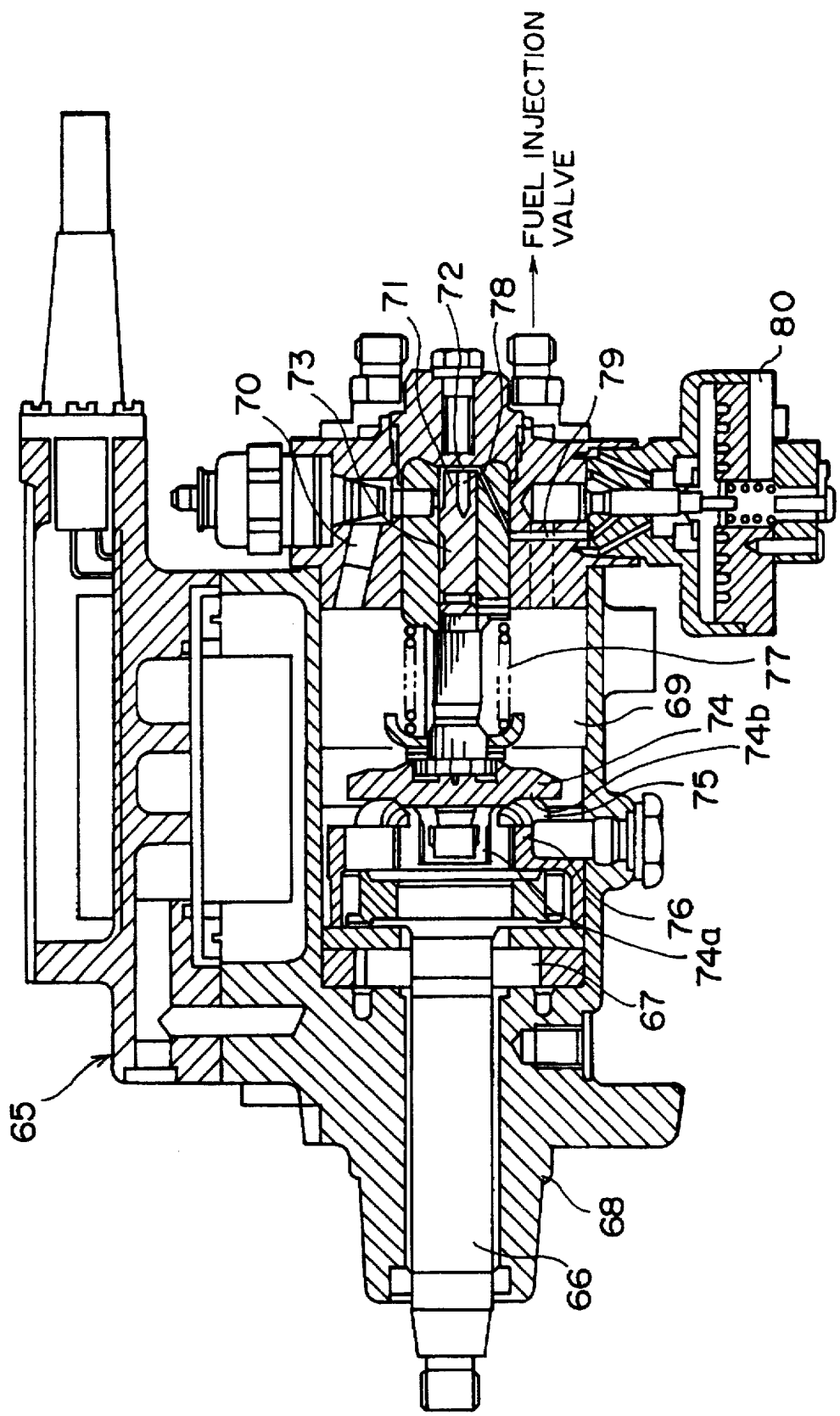
FIG. 11 is a sectional view of a fuel injection pump, according to the second embodiment of this invention.

The construction of the fuel injection pump 13 is shown in FIG. 11. This pump is a distribution type fuel injection pump whose fuel injection amount and fuel injection timing can be controlled electronically. The basic construction of the distribution type fuel injection pump is per se known, for example from DE 4 323 967 A1 published by the German Patent Office on Jan. 20, 1994.

A drive shaft 66 shown in the figure is connected to the output shaft of the engine 10, and drives a vane type feed pump 67. Fuel which is sucked into the vane type feed pump 67 through a fuel inlet aperture not shown in the drawing is supplied to a pump chamber 69 within a housing 68. This fuel is then fed, via an inlet conduit 70 which opens into the pump chamber 69, into a plunger chamber 72 of a plunger pump 71.

A face cam 74 which is fixed to a base end of a plunger 73 is engaged to one end of the drive shaft 66 via coupling 74a such that the face cam 74 rotates together with the shaft 66 while It is free to slide in the axial direction.

A roller holder 76 which supports a plurality of rollers 75 is disposed on the outside of the linking portions of the drive shaft 66 and the face cam 74 so as to be coaxial with the drive shaft 66. On the face cam 74 there is formed a cam face 74b which has the same number of raised portions as the number of engine cylinders, and this cam face 74b is maintained in contact with the rollers 75 by a spring 77.

With this construction, when the drive shaft 66 rotates, the face cam 74 and the plunger 73 are driven to and fro in the axial direction as they rotate together with the drive shaft 66, as the cam face 74b rides up upon the rollers 75.

At the end of the plunger 73 there are formed a plurality of intake grooves 78, the same in number as the number of cylinders of the engine 10. When the plunger 73 moves axially to and fro while rotating together with the drive shaft 66, fuel which is sucked from the intake grooves 78 into the plunger chamber 72 passes through the plunger chamber 72 and is expelled under pressure from distribution ports via delivery valves not shown in the figure to fuel injection valves for each of the engine cylinders.

The plunger chamber 72 and the low pressure pump chamber 69 are communicated together by a fuel return conduit 79. A high speed response type electromagnetic valve 80 is provided in this fuel return conduit 79, and is opened and closed by a pulse signal which is sent from the control unit 18.

This electromagnetic valve 80 is provided for controlling fuel injection. That is, the injection of fuel starts when the electromagnetic valve 80 is closed during the compression stroke of the plunger 73, and fuel injection is terminated when the electromagnetic valve 80 is opened. Accordingly, the timing of start of fuel injection is controlled according to the timing at which the electromagnetic valve 80 is closed, while the amount of fuel injection is controlled according to the timing at which the valve 80 is opened.

The greater is the EGR ratio, the more should the timing of start of fuel injection be delayed; by doing this, the delay time between fuel injection and ignition is lengthened.

Figure 12:
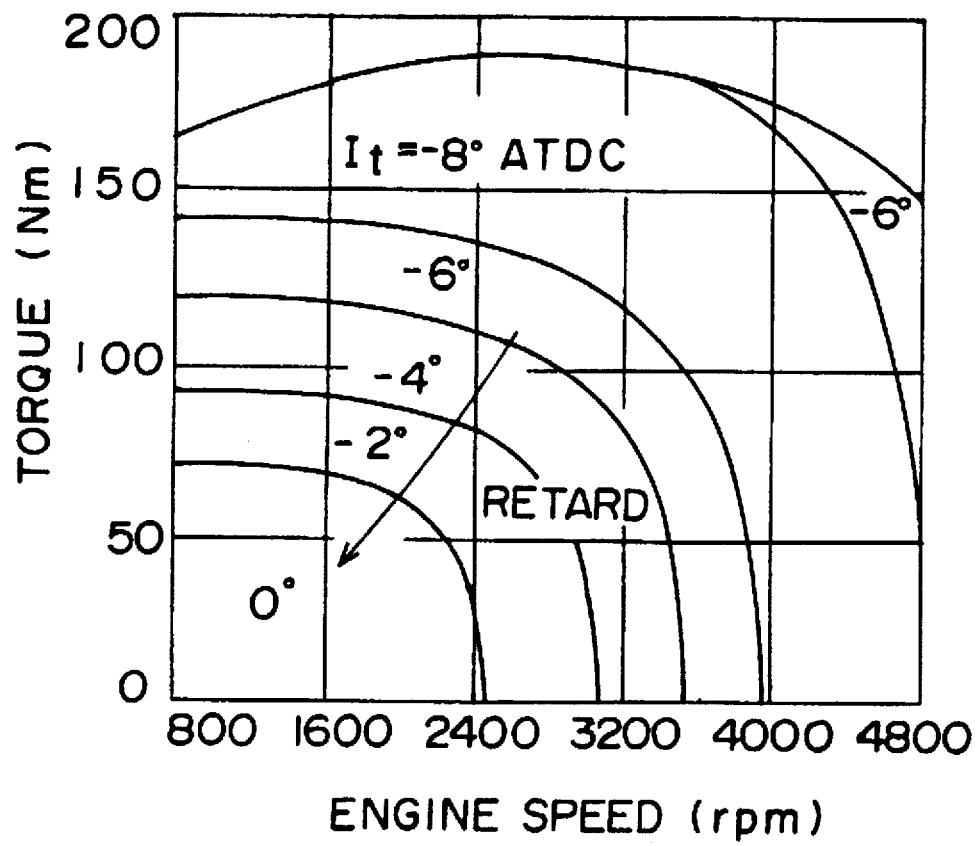
FIG. 12 is a graph showing the characteristics for fuel injection timing It, according to the second embodiment of this invention.

FIG. 12 is a fuel injection timing map. In FIG. 10, the lower the engine revolution speed and the load are, the higher was the EGR ratio. Accordingly, in FIG. 12 the fuel injection timing is retarded as EGR ratio increases, and the greatest retardation for the timing is set to the piston top dead center (TDC). By this setting, the temperature in the combustion chamber at the time point of ignition is lowered, the proportion of previously-mixed fuel combustion is increased, and the generation of smoke in the high EGR condition is suppressed.

The fuel injection timing is advanced when the engine revolution speed and the load become high. Even if the time period for ignition delay is fixed, when this time period for ignition delay is expressed in terms of crank angle as an ignition delay crank angle, it appears greater according to increase of the engine revolution speed. Accordingly, it becomes necessary to advance the fuel injection timing, in order to obtain a specified ignition timing at a low EGR ratio, which is applied when the engine speed and load are high.

The control unit 18 controls the opening and closing timing of the electromagnetic valve 80, via output of an appropriate pulse signal, so as to provide the fuel injection timing characteristic shown in FIG. 12.

Figure 13:
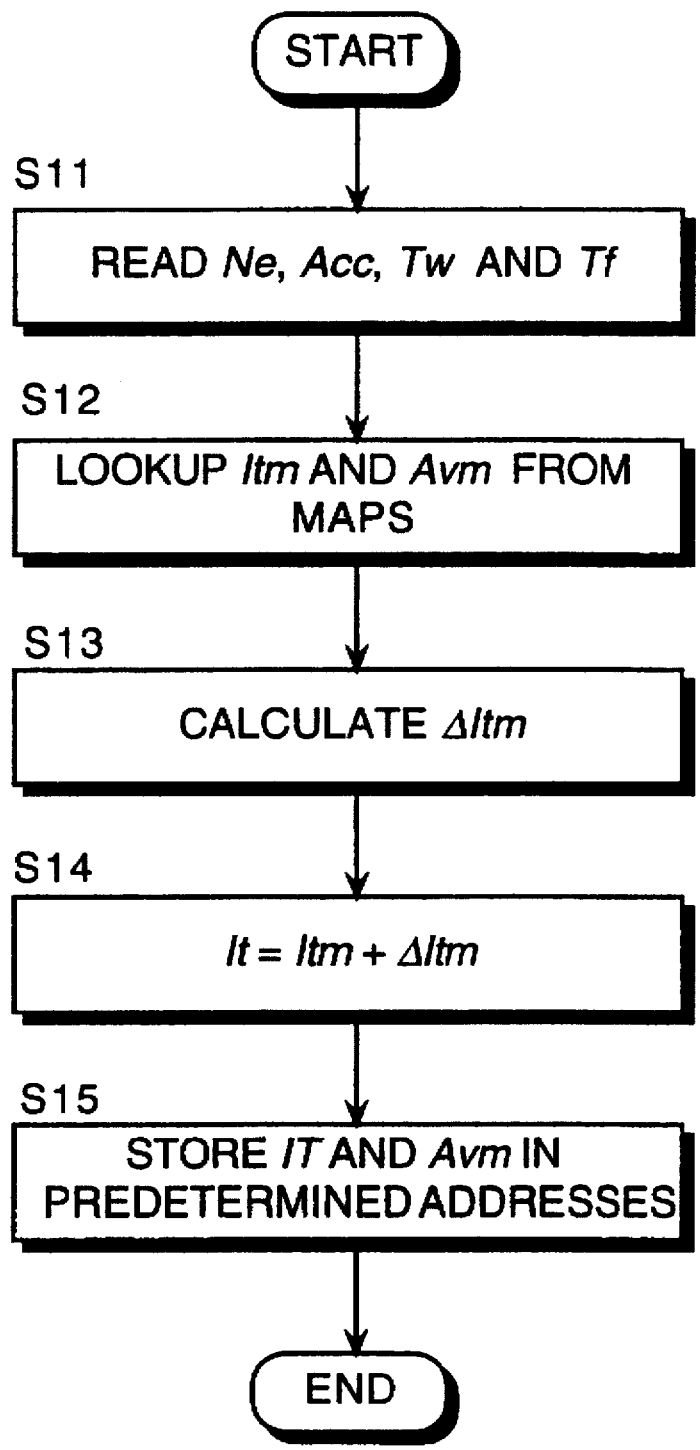
FIG. 13 is a flow chart showing a control process for fuel injection timing and duration, according to the second embodiment of this invention.

This control process is shown in the FIG. 13 flow chart.

Herein, in the first step S11, the engine revolution speed Ne, the accelerator opening amount Acc, the engine cooling water temperature Tw, and the fuel temperature Tf are read in.

In the step S12, a basic fuel injection timing and a basic fuel injection period Avm are determined by look up from maps which are stored in the control unit 18, based upon the engine revolution speed Ne and the accelerator opening amount Acc.

Figure 14:
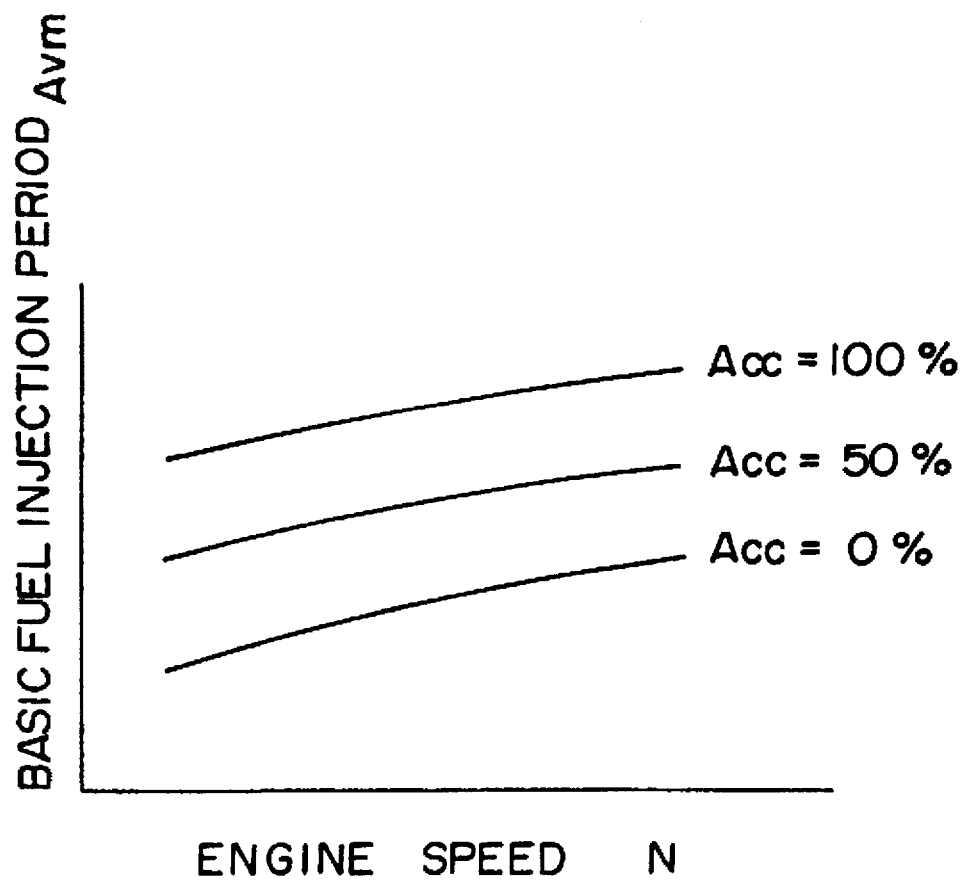
FIG. 14 is a graph showing the characteristics of a basic fuel injection period Avm, according to the second embodiment of this invention.

The map for the basic fuel injection timing Itm is a map, not shown in the figures, which determines the basic fuel injection timing Itm as a function of accelerator opening amount Acc and engine revolution speed Ne, so as to obtain the fuel injection timing characteristic shown in FIG. 12. And the map for the basic fuel injection period Avm is shown in FIG. 14. In this map, for the same engine revolution speed Ne, the greater is the accelerator opening amount Acc, the longer is the basic fuel injection period Avm set to be.

In the step S13, a fuel injection timing correction value $\Delta$Itm is obtained from the fuel temperature Tf and the engine cooling water temperature Tw, and in the step S14 this is added to the basic fuel injection timing Itm, so as to derive a corrected fuel injection timing it.

The fuel injection timing correction value $\Delta$Itm is the sum of two correction values $\Delta$Itm$_1$ and $\Delta$Itm$_2$. FIG. 15 shows the characteristic for $\Delta$Itm$_1$, while FIG. 16 shows the characteristic for $\Delta$Itm$_2$. In both of these characteristics, the lower is the temperature, the more advanced is the timing correction. This is because the speed of fuel ignition becomes slower when the temperature becomes low.

In the step S15, the fuel injection timing IT(=Itm+$\Delta$Itm) obtained in this manner and the basic fuel injection period Avm are stored in predetermined addresses. When this has been done, the electromagnetic valve 80 is closed at a time point which is determined according to the fuel injection timing it thus stored, and subsequently the electromagnetic valve 80 is opened at an opening time point at which a time period equal to the basic fuel injection period Avm thus stored has elapsed from this closing time point.

In branch pipes 81 from the intake manifold 41 of the engine 10 towards each of the intake ports there are interposed swirl valves 83 in which cutaway portions 82 are formed as shown in FIG. 17.

Each of the swirl valves 83 is fixed upon a shaft 84 which is operated via an actuator not shown in the figures by the control unit 18, which performs control so as to close the swirl valves 83 in the low revolution speed and low load operational region.

When the swirl valves 83 are closed, gas can only pass towards the combustion chambers through the cutaway portions 82, and thereby the speed of the flow of gas into the combustion chambers is increased, which generates swirl in the combustion chambers.

In the case of an engine which has two intake valves for each cylinder, it would also be possible to close one of these two intake valves in the low revolution speed low load operational region, in order to generate swirl.

The control unit 18 controls the closing timing of the intake valves 20 as described below.

It performs control, based upon the engine revolution speed Ne, the accelerator opening mount Acc, the intake air flow mount Qa, the intake gas temperature Ta, the fuel injection amount Qf, the oxygen concentration in the exhaust gas, and the compression ratio, so that the compression stroke end temperature Tc, i.e. the gas temperature in the cylinder at the compression top dead center, is brought to be a predetermined temperature (850° K.±25° K.).

This compression stroke end temperature Tc is calculated as described below, by a per se known method of calculation.

(1) The value Qa$_0$, which would be the intake air flow mount if the EGR ratio were 0%, is read out from a map. This map is stored in the control unit 18 in advance, and stores values of Qa$_0$ according to the engine revolution speed Ne and the accelerator opening mount Acc.

(2) The EGR ratio is calculated from the following equation:

$$EGR\ rate = \left(\frac{Qa_0 - Qa}{Qa_0}\right) \times 100\%$$

where, Qa is the actually measured intake air flow amount.

(3) The specific heat ratio κ is read out from a map which determines it according to the engine revolution speed Ne and the composition of the intake gas, which is derived from the EGR ratio and the concentration of oxygen in the exhaust gas.

(4) The apparent compression ratio ε is determined from the closing timing of the intake valves 20. This apparent compression ratio ε means the ratio of the volume of the cylinder at the time point of closure of the intake valves to the volume of the cylinder at compression top dead center.

(5) The compression stroke end temperature Tc is calculated from the following equation:

$$Tc = \text{temperature in intake manifold} \times \epsilon^{(\kappa-1)}$$

As shown in FIG. 18, by keeping this compression stroke end temperature Tc in the range of ±25° K. from a standard temperature of 850° K., it is possible to suppress the generation of dry soot and SOF, which are components of particulate smoke, to desirably low levels.

Figure 19:
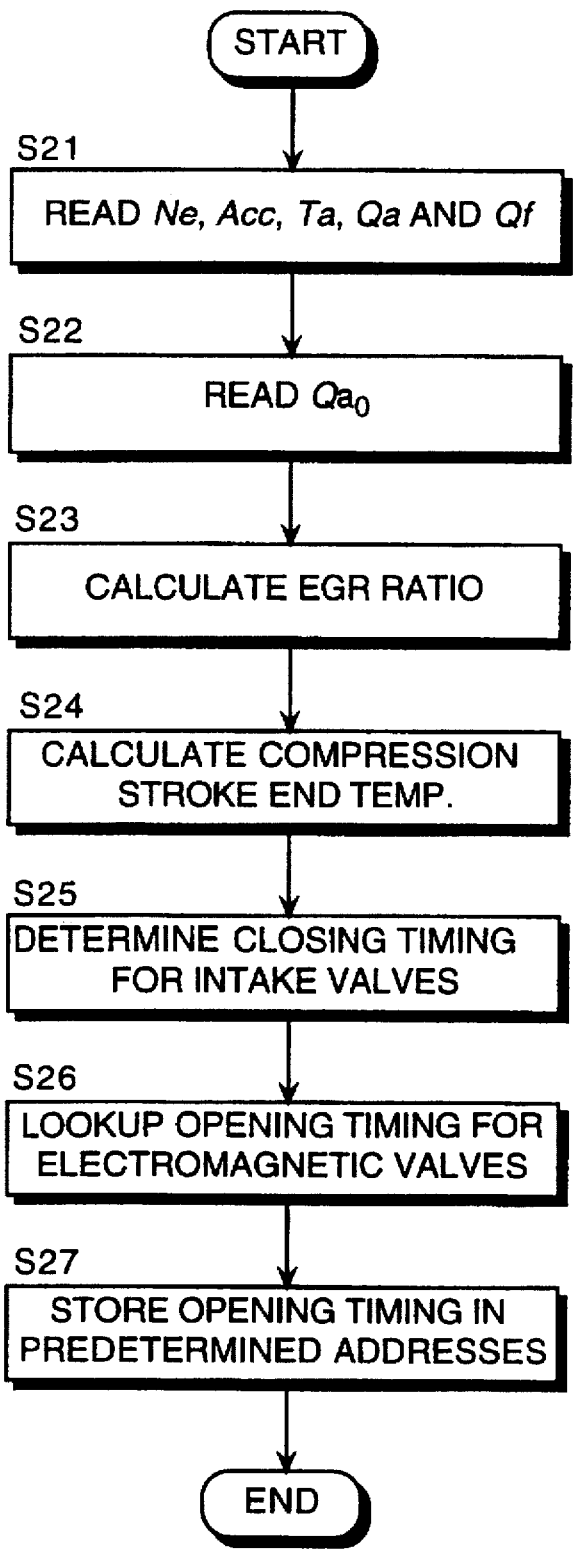
FIG. 19 is a flow chart showing a control process for the intake valve closing timing, according to the second embodiment of this invention.

FIG. 19 is a flow chart showing the control for the closing timing of the intake valves 20.

In the step S21, the engine revolution speed Ne, the accelerator opening amount Acc, the intake air flow mount Qa, the intake gas temperature Ta, and the fuel injection amount Qf are read in.

In the step S22, based upon Ne and Acc, the value $Qa_0$, which would be the intake flow amount if the EGR ratio were 0%, is read in from a map.

In the step S23, the EGR ratio is calculated from Qa and this value $Qa_0$.

In the step S24, the ratio of specific heats κ and the apparent compression ratio ε are read in from maps which are provided for the purpose, and the compression stroke end temperature Tc is calculated.

In the step S25, a decision is made as to whether or not the calculated value for final compression temperature Tc is within the range of 850° K.±25° K. shown in FIG. 18. And, moreover, if the compression stroke and temperature Tc is higher than this range, the closing timing for the intake valves 20 is retarded, so that the compression stroke end temperature Tc is reduced by the apparent compression ratio being lowered. On the other hand, if the final compression temperature Tc is lower than this range, the closing timing for the intake valves 20 is advanced, so that the compression stroke end temperature Tc is increased by the apparent compression ratio being raised. However it is ensured that, even when the closing timing for the intake valves 20 is advanced to the maximum, it is not set earlier than bottom dead center. The closing timing for the intake valves 20 is determined according to the above described standard.

In the step S26, the valve opening timing for the outlet side electromagnetic switchover valves 33 and 34 which corresponds to this obtained closing timing for the intake valves 20 is read out, and is stored in a predetermined address in the step S27. The closing timing for the intake valves 20 may be controlled by opening the outlet side electromagnetic switchover valves 33 and 34 based upon this stored valve opening timing.

In the case of reducing NOx emission by performing EGR, the emission of NOx can be considerably reduced by implementing a high EGR ratio, but the down side of this is that there is a tendency to increase the emission of smoke, and in this case, when the ignition delay period is lengthened by retarding the fuel injection timing according to the above described control, it is possible to suppress the generation of smoke.

FIGS. 20A and 20B show the characteristics of the concentrations of smoke and NOx in the exhaust gas with respect to EGR ratio, both when the fuel injection timing is set to 8° BTDC and also when it is retarded to TDC. With the fuel injection timing at 8° BTDC (It=−8°ATDC), the concentration of NOx in the exhaust decreases along with increase of the EGR ratio, while the concentration of smoke rises upon an abrupt curve.

In contrast to this, with the fuel injection timing at top dead center (It=TDC), the concentration of NOx in the exhaust decreases in accompaniment with increase in the EGR ratio, and further it is shown that the concentration of smoke also has a tendency to decrease. This type of reduction in the concentration of smoke is because, in accompaniment with the promotion of good mixing together of fuel and air due to swirl in the combustion chambers, the ignition delay period is lengthened by retarding the fuel injection timing, as will be understood from the heat generation patterns shown in the figures, so that the greater part of the combustion is in the form of previously-mixed fuel combustion.

On the other hand, since this method performs combustion at a relatively low temperature, it may happen that the generation of SOF is increased. FIG. 18 shows the change in the amounts of SOF, dry soot, and all particulate matter in the exhaust gases, and it is seen that, when the compression stroke end temperature Tc is greater than the predetermined temperature range, the ignition delay time period becomes shorter so that dry soot (smoke) is generated, while on the contrary, when this compression stroke end temperature Tc is less than the predetermined range, the emission of SOF, which consists of uncombusted fuel, increases abruptly as this temperature Tc drops.

Thus it is seen that, with this invention, it is possible to repress the emissions of both smoke and SOF to low levels, and to assure preferable exhaust gas composition, by changing the closing timing for the intake valves 20 so as to keep the compression stroke end temperature Tc within the predetermined range.

Accordingly, although the present invention has been shown and described in terms of the preferred embodiments thereof, it is not to be considered as limited by any of the perhaps quite fortuitous details of said embodiment, or of the drawings, but only by the terms of the appended claims, which follow.

I claim:

1. A diesel engine comprising:

a cylinder, a piston which reciprocates within said cylinder between a bottom dead center position and a top dead center position, an intake valve for providing air to said cylinder, a mechanism for alterating closing timing of said intake valve, means for detecting an engine operational condition, means for detecting a temperature of said air, means for detecting a flow amount of said air, means for calculating a temperature within said cylinder at compression top dead center from said engine operational condition, said temperature, said flow amount and a compression ratio of said piston, and means for controlling said closing timing alteration mechanism so as to advance said closing timing of said intake valve when said temperature within said cylinder is lower than a predetermined range, and so as to retard said closing timing of said intake valve when said temperature within said cylinder is higher than said predetermined range.

2. A diesel engine according to claim 1, further comprising a mechanism for injecting fuel into said cylinder at a predetermined timing, means for providing a portion of exhaust gas to said cylinder and means for retarding said predetermined timing according to an amount of said portion of exhaust gas.

* * * * *